May 22, 1962 A. E. BURCH 3,035,740
FERTILIZER SPREADER
Filed Aug. 7, 1959 3 Sheets-Sheet 2
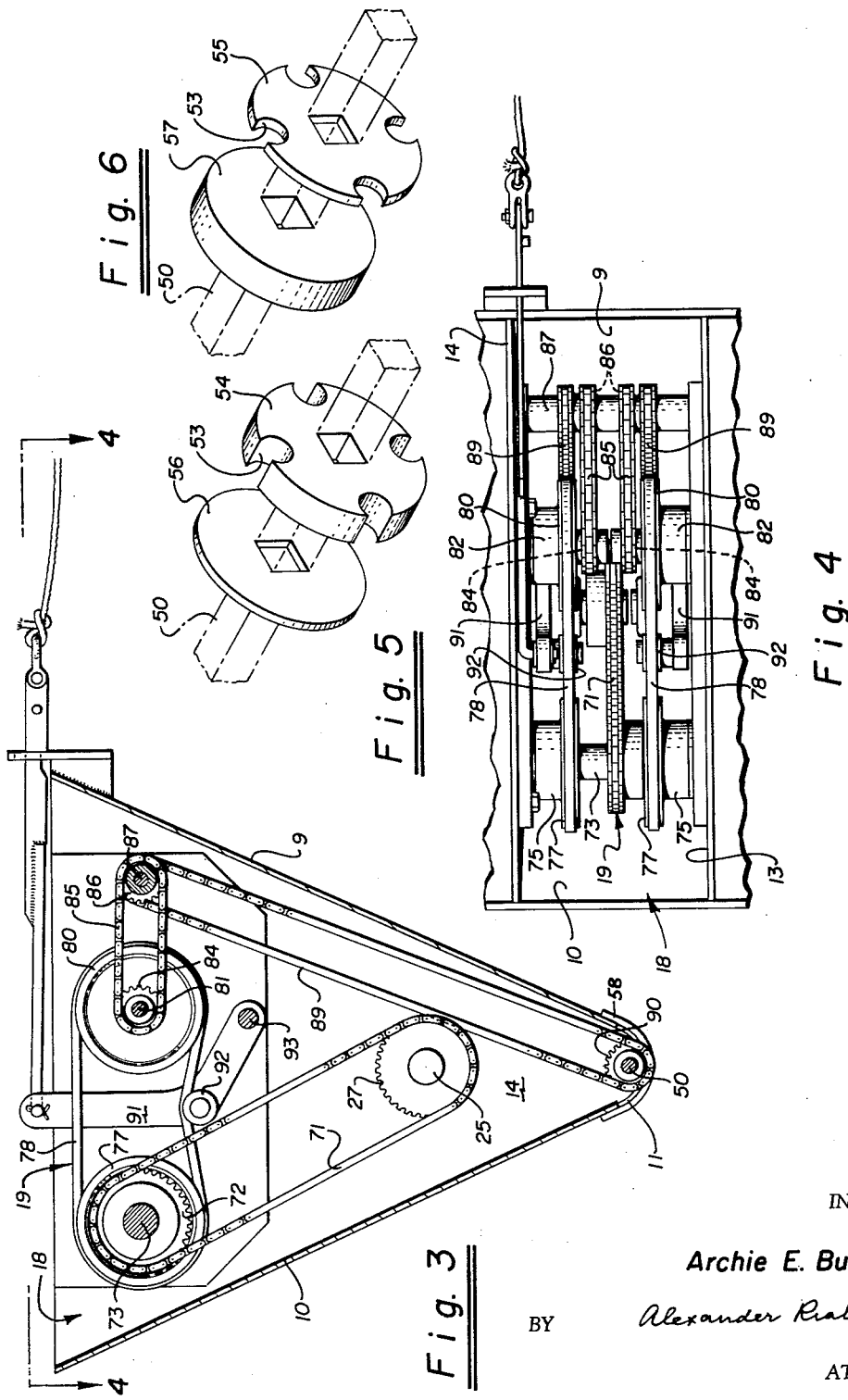
INVENTOR
Archie E. Burch
BY Alexander Riaboff
ATTORNEY May 22, 1962  A. E. BURCH  3,035,740
FERTILIZER SPREADER
Filed Aug. 7, 1959  3 Sheets-Sheet 3
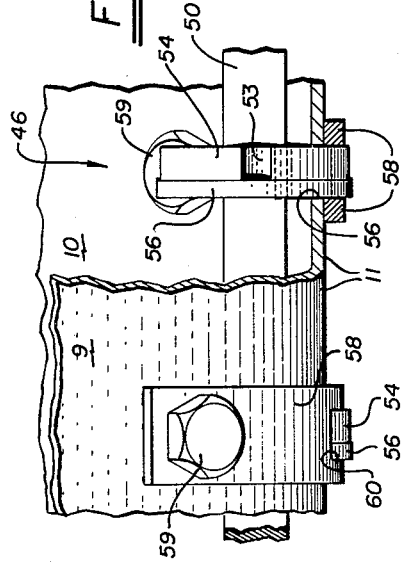
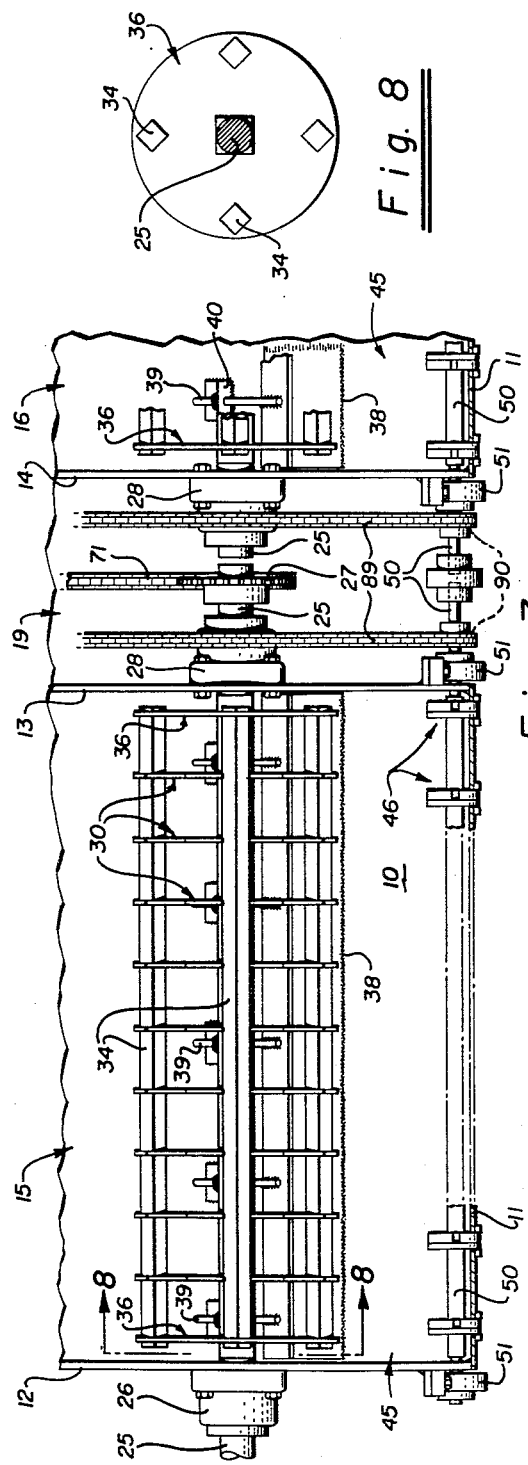
INVENTOR
Archie E. Burch
BY Alexander Riaboff
ATTORNEY

United States Patent Office 3,035,740
Patented May 22, 1962

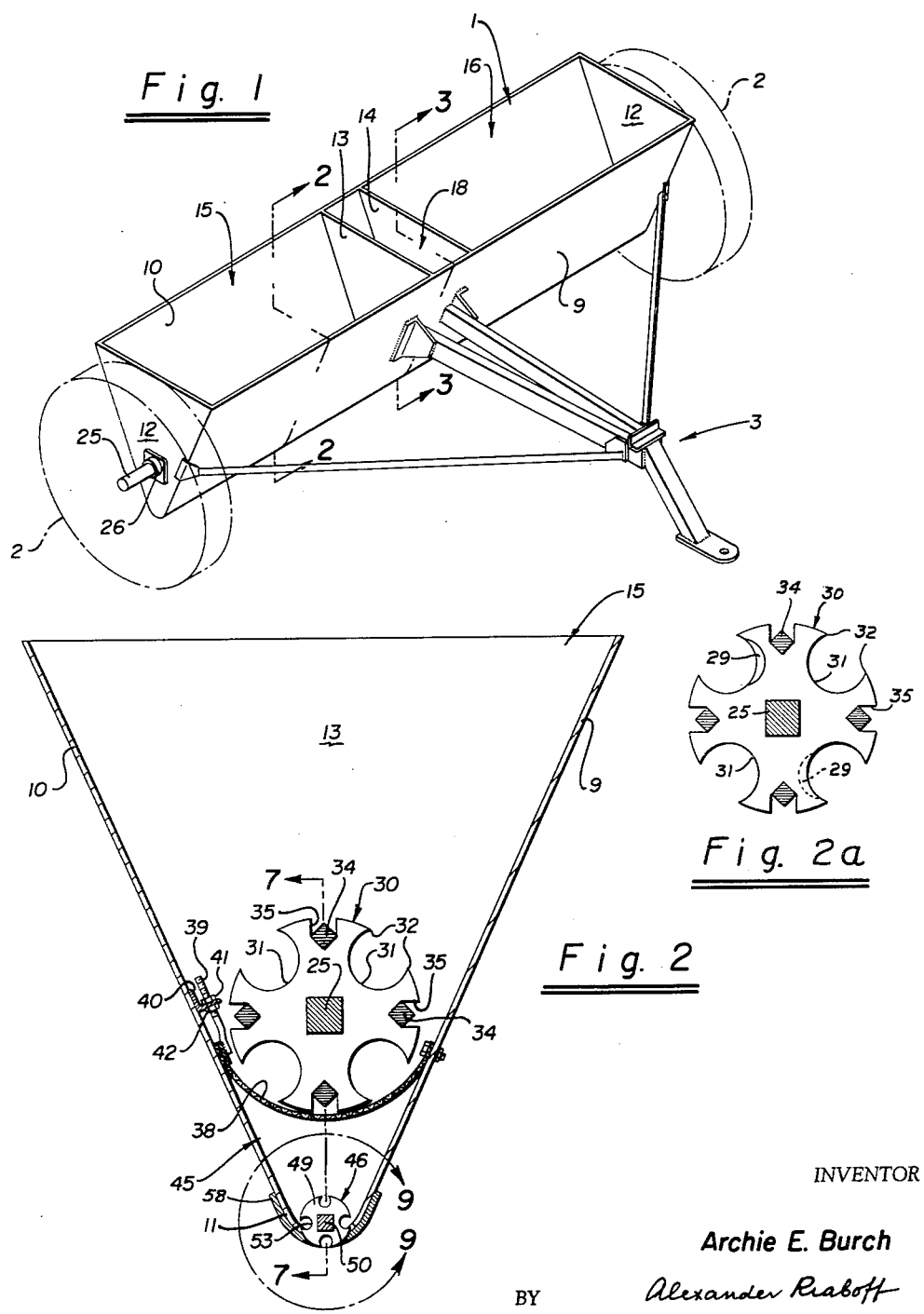

3,035,740
FERTILIZER SPREADER
Archie E. Burch, P.O. Box 595, Williams, Calif.
Filed Aug. 7, 1959, Ser. No. 832,304
2 Claims. (Cl. 222—139)

This invention relates to a new and useful improvement in a fertilizer spreader, and particularly in a manure spreader.

Commercial fertilizers and particularly manure are usually stored and shipped in bags or other containers. During storage and transportation commercial fertilizers and manure form large and hard lumps which are difficult to break up.

The object of ths invention is to provide a fertilizer spreader which is particularly adapted to break up lumps of commercial fertilizer, or manure, and evenly distribute the same in measured quantities over a field.

Another object of this invention is to provide special means for breaking up the lumps into small particles.

Another object of this invention is to provide special means by which the broken up particles of fertilizer or manure are evenly and uniformly distributed over a field in measured quantities.

Another object of this invention is to provide a device of the type described in which fertilizer is carried in a hopper and is discharged therefrom in definite small amounts over a field.

Another object of this invention is to provide a device of the type described in which the rate of discharge of the fertilizer out of the hopper may be varied as well as the amount of each discharge.

Another object of this invention is to provide a device of the type described in which the driving mechanism is located in the middle of said hopper.

Other objects and advantages will appear as the specification proceeds and the novel features of the device will be particularly pointed out in the claims hereto annexed.

In this specification and the annexed drawing, the invention is illustrated in the form considered to be the best but it is understood, that the invention is not limited to such form; and it is also to be understood that in and by the claims following the description, it is desired to cover the invention in whatsoever form it may be embodied.

This invention is illustrated in the drawings forming a part of this specification in which:

FIG. 1 is a perspective view of the fertilizer spreader.

FIG. 2 is an enlarged vertical cross-section, taken along the line 2—2 of FIG. 1.

FIG. 2a shows a modified disk element.

FIG. 3 is an enlarged vertical cross-section taken along the line 3—3 of FIG. 1, showing the inner driving mechanism thereof.

FIG. 4 is a plan view of the driving mechanism as seen from the line 4—4 of FIG. 3.

FIG. 5 and FIG. 6 show different arrangements of distributing disks on the shaft.

FIG. 7 is a partial vertical longitudinal cross-section through the hopper.

FIG. 8 is a side view of the end disk of the fertilizer disintegrator mechanism.

FIG. 9 is an enlarged cross-section of the lower portion of the hopper showing the manure distributing disk, and FIG. 10 is a side view, partly in section, of the lower part of the hopper.

In detail, my fertilizer spreader consists of a hopper 1, supported on the ground by wheels 2 arranged on both sides thereof and a yoke 3 by which said spreader is connected to a tractor for moving the same.

The hopper 1 is generally V-shaped and consists of a front wall 9 and a back wall 10, connected by a rounded bottom 11 and having its sides closed by side walls 12. The hopper 1 is divided by two central transverse partitions 13 and 14 into two end fertilizer compartments 15 and 16 and a central compartment 18 containing a driving mechanism 19.

Each fertilizer compartment 15 and 16 is provided with a shaft 25 extending the whole length of the compartment and being rotatably supported in an outer bearing 26 on the side wall 12 and an inner bearing 28 on the transverse partition. The shaft 25 extends beyond said outer bearing 26 and carries on its free end said wheel 2. The other end of said shaft extending beyond said inner bearing 28 carries a driving sprocket 27 which comprises a part of the driving mechanism 19 to be described in detail hereinafter.

Each of the compartments 15 and 16 is provided with a means for tearing apart fertilizer lump and for beating the same into fine particles which pass through a screen 38 into a fertilizer distributing section of the hopper 1 from which it is evenly distributed on the ground in measured amounts.

The means for tearing fertilizer lumps and beating the same into fine particles includes a plurality of equally spaced disc elements 30 transversely secured to the shaft 25 for rotation therewith. Each disc element is provided with preferably four rounded indentations 31 forming eight scarifying teeth 32 on the periphery of said disc for the purpose of biting into and tearing apart fertilizer lumps. The disk elements 30 are connected by four longitudinal disk bars 34 arranged in the peripheral depressions 35. The bars 34 are preferably square in cross-section and have one angle arranged radially substantially level with the periphery of said disk element. The outermost disks 36 are preferably made without scarifying teeth, as shown in FIG. 8.

The rounded screen 38 is arranged inside the compartments 15 and 16 which extends from the front wall 9, to which it is rigidly secured, to the rear wall 10 to which the same is adjustably secured by means of a plurality of bolts 39 connected to said screen, each passing through a corresponding angle iron 40 attached to the wall 10. The adjustment is made by means of nuts 41 and 42 carried by said bolt and abutting said angle iron 40.

The screen 38 is arranged in close vicinity to said disk elements 30 so that the latter pick up by their teeth 32 fertilizer lumps from the screen, and the disk bars 34 sweep the screen and lift the lumps which settle between said disk elements. The beating of the fertilizer by said teeth 32 and the bars 34 pulverizes it, and constant lifting and turning of said fertilizer and the sweeping action of the bars 34 force the pulverized fertilizer through the screen into a lower fertilizer distributing section 45 of said hopper 1, wherein a special mechanism 46 picks up said fertilizer in measured quantities and passes the same at the desired rate from said section onto the ground.

The mechanism 46 consists of a shaft 50 rotatably secured in bearings 51 in the sidewalls 12 and partitions 13 and 14 and extending longitudinally and parallel to the bottom 11 of said hopper 1. The shaft 50 is preferably square in cross-section and slidably carries thereon a plurality of comparatively small distributing disks, each of which has four rounded discharging cavities 53 equally spaced on the periphery thereof, each cavity forming a pair of opposite sharp teeth 49 on the outer edge of the disk for picking up fertilizer in the lower section 45 of the hopper and filling up the cavity with the same. The disks are made of different thickness, such as: five-eighths, denoted 54 and three-eighths of an inch, denoted 55. Some of the disks denoted 56 and 57 are blank without cavities.

The bottom 11 of the hopper 1 is slit, as shown at 52, and carries on the outer side thereof a guard strip 58 which is secured thereto by bolts 59. The strip 58 has a slit 60 therein through which the lower portions of the disks pass below said strip. The width of the slit is slightly over one inch so as to accommodate therein two disks 54 and 55, or 54 and 57, or 55 and 56, or 56 and 57, depending upon the amount of fertilizer to be discharged on the ground.

The first mentioned combination of disks (54 and 55) has a combination of cavities 53 one inch wide, while the second combination, shown in FIG. 5, is only five-eighths of an inch wide, one of the disks being blank. The third combination, shown in FIG. 6, has a cavity only three-eighths of an inch wide, whereas the fourth combination consisting of two blank disks has no cavities at all.

The disks 54 and 55, rotating in a mass of fine powdered fertilizer, fill their respective cavities 53 with said fertilizer and when said filled cavity is brought in a downward position (as shown in FIG. 9), the fertilizer is discharged on the ground. If the rotation of said disks should stop, no fertilizer shall pass on the ground, as the disks close the slits 52 and 60. It is obvious that the number of cavities on the disks may vary, and the disks with two diametrically located cavities would not need the guard strip 58, as the rounded periphery of the latter disk shall be sufficient to close the slit 52, if the rotation of the shaft 50 should stop.

The driving mechanism 19 comprises the driving sprocket 27 secured to the end of one of the shafts 25, protruding in the compartment 18. The sprocket 27 is connected by a chain 71 to a sprocket 72 located above the first mentioned sprocket and secured to a shaft 73 rotatably carried in bearings 75 affixed to the partitions 13 and 14. The shaft 73 also carries pulleys 77 near said sprocket 72. Each of said pulleys is connected by a belt 78 with a pulley 80 secured to a shaft 81 rotatably supported in a bearing 82 affixed to one of said partitions. Each shaft 81 also carries secured thereto a sprocket 84, each of which is connected by a chain 85 with a sprocket 86 secured to a shaft 87. The latter shaft also carries secured thereto a pair of sprockets which are operatively connected by chains 89 to sprockets 90 secured to the ends of the shafts 50.

The shafts 25 are rotated by the rotation of the wheels 2 while the hopper is pulled by a tractor over a field. The rotation of said shafts 25 is transferred through the above described sprockets, chains, pulleys and belts to the shafts 50 and forces the same to rotate.

A pair of levers 91, each having a freely rotating pressure pulley 92, are provided in said central compartment 18, which levers have the lower ends thereof secured to a shaft 93 extending across said compartment. By pulling the levers 91 to the right, looking at FIG. 3, pressure is applied on the belts 78 thus forcing the pulleys 80 to rotate. When the above described pressure on the belts 78 is eliminated, the rotation of the pulleys 77 is not transferred to the pulleys 80 and the fertilizer dispersing mechanism stops rotating.

If desired the sprockets and pulleys may be substituted by a different set giving a different ratio of rotation of the shafts 50 in relation to the shafts 25, thus changing the rate of speed of discharge of fertilizer on the ground.

The disc elements 30 may have the edge of one or more indentations 31 partially bevelled as shown at 29 in FIG. 2–a, so as to push the fertilizer away from said disc element toward the other discs and thereby to increase the passage of pulverized fertilizer through said screen 38.

I claim:
1. A fertilizer spreader comprising:
   a hopper having a front and back walls, two sides and a bottom;
   a screen arranged in the hopper in spaced relation to the bottom thereof;
   a mechanism for pulverising fertilizer lumps and forcing the pulverized fertilizer through said screen onto the bottom, including:
   a shaft arranged above and parallel to said screen and rotatably carried by the hopper sides,
   a plurality of disks secured to said shaft, each disk being formed with peripheral indentations terminating with scarifying teeth at the periphery of the disk for tearing the fertilizer lumps apart;
   a plurality of bars secured to said disks in close proximity to the periphery thereof for sweeping over the screen, pulverizing the fertilizer and for forcing the same through the screen, and means for rotating said shaft;
   a mechanism arranged in said hopper under said screen for distributing the screened fertilizer onto the ground in measured amounts including:
   a shaft arranged in said hopper in close proximity to the bottom of said hopper parallel thereto and rotatably secured in the hopper sides;
   a plurality of fertilizer discharging disks on the last mentioned shaft, each having cavities on the periphery thereof,
   each cavity forming a sharp tooth on the periphery of the disk for picking up the fertilizer and filling up the cavity with the same,
   and means for rotating the last mentioned shaft, said hopper bottom being provided with a slit opposite each fertilizer discharging disk, through which slits the latter disks partially protrude outside the hopper for carrying the fertilizer in the disk cavities from said hopper through said slits outside the hopper and discharging the same on the ground.

2. In a fertilizer spreader comprising a hopper, a mechanism for distributing fertilizer from said hopper onto the ground in measured amounts including:
   a shaft rotatably secured to the hopper in close proximity to the bottom thereof,
   a plurality of fertilizer discharging disks on said shaft, arranged for rotation at least partially in the fertilizer in said hopper;
   each disk having cavities on the periphery thereof,
   a sharp tooth formed on the periphery of said disk at the entrance into each of said cavities for picking up the fertilizer and filling up the cavity with the same;
   means for rotating said shaft,
   said hopper having a slit in its bottom for each of said disks, in which slits said disks are arranged so as to be partially in the hopper and partially outside the same for carrying the fertilizer in the disk cavities from said hopper through said slits outside the hopper and for discharging the same on the ground.

References Cited in the file of this patent

UNITED STATES PATENTS

| | | |
|---|---|---|
| 44,785 | Conkling | Oct. 25, 1864 |
| 2,569,421 | Larson | Sept. 25, 1951 |
| 2,761,589 | Stach | Sept. 4, 1956 |
| 2,899,111 | Christensen | Aug. 11, 1959 |
| 2,906,438 | Carpenter | Sept. 29, 1959 |
| 2,938,652 | Polzin | May 31, 1960 |